(12) United States Patent
Achilles (10) Patent No.: US 9,110,875 B2
(45) Date of Patent: Aug. 18, 2015

(54) XML POST-PROCESSING HARDWARE ACCELERATION

(75) Inventor: Heather D. Achilles, Hudson, NH (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 12/703,872

(22) Filed: Feb. 11, 2010

(65) Prior Publication Data

US 2011/0197149 A1 Aug. 11, 2011

(51) Int. Cl.
*G06F 17/00* (2006.01)
*G06F 17/22* (2006.01)
*G06F 17/27* (2006.01)

(52) U.S. Cl.
CPC ........ *G06F 17/2247* (2013.01); *G06F 17/2294* (2013.01); *G06F 17/2725* (2013.01)

(58) Field of Classification Search
CPC .................................................. G06F 17/2247
USPC .......................................... 715/237; 712/204
See application file for complete search history.

(56) References Cited

U.S. PATENT DOCUMENTS

| | | | | |
|---|---|---|---|---|
| 4,686,649 A | * | 8/1987 | Rush et al. | 715/234 |
| 4,907,275 A | * | 3/1990 | Hashimoto | 713/161 |
| 6,230,288 B1 | * | 5/2001 | Kuo et al. | 714/38.14 |
| 7,043,017 B2 | * | 5/2006 | Swindlehurst et al. | 380/29 |
| 7,249,196 B1 | * | 7/2007 | Peiffer et al. | 709/246 |
| 7,251,777 B1 | * | 7/2007 | Valtchev et al. | 715/234 |
| 7,287,217 B2 | | 10/2007 | Kuznetsov et al. | |
| 7,305,615 B2 | | 12/2007 | Ross | |
| 7,318,194 B2 | | 1/2008 | Achilles et al. | |
| 7,454,696 B2 | | 11/2008 | Kuznetsov et al. | |
| 7,496,612 B2 | | 2/2009 | Magee et al. | |
| 7,596,745 B2 | * | 9/2009 | Dignum et al. | 715/234 |
| 7,672,302 B2 | * | 3/2010 | Wybenga et al. | 370/389 |
| 7,703,006 B2 | * | 4/2010 | Lemoine | 715/234 |
| 8,127,226 B2 | * | 2/2012 | Kuznetsov et al. | 715/239 |
| 2003/0090981 A1 | * | 5/2003 | Yokoi | 369/59.11 |
| 2003/0229833 A1 | * | 12/2003 | Nadeau-Dostie | 714/726 |
| 2004/0156371 A1 | * | 8/2004 | Kumar et al. | 370/401 |
| 2004/0205292 A1 | * | 10/2004 | Lu | 711/108 |
| 2005/0091589 A1 | * | 4/2005 | Ramarao | 715/522 |
| 2005/0140411 A1 | * | 6/2005 | Fallahi et al. | 327/231 |
| 2006/0085489 A1 | * | 4/2006 | Tomic et al. | 707/200 |

(Continued)

OTHER PUBLICATIONS

W3, "Extesnible Markup Lanague (XML) 1.0 (Third Edition)", Apr. 2004, pp. 1-59, URL <http://www.w3.org/TR/2004/REC-xml-20040204/>.*

(Continued)

*Primary Examiner* — Scott Baderman
*Assistant Examiner* — Mustafa Amin
(74) *Attorney, Agent, or Firm* — Jennifer Davis; Hoffman Warnick LLC (57) ABSTRACT

Aspects of the invention are directed to XML post-processing hardware acceleration for high-speed simple type checking (e.g., string and format checking) and whitespace collapsing. An apparatus for processing text data according to an embodiment includes a post processing engine (PPE); a set of post processing state machines coupled to the PPE; and a memory for storing text data to be processed by the set of post processing state machines; wherein the set of post processing state machines includes a whitespace handler state machine for reading text data from the memory and for applying a whitespace facet to at least 4 bytes of the text data during a clock cycle.

24 Claims, 4 Drawing Sheets

(56) References Cited

U.S. PATENT DOCUMENTS

| | | | |
|---|---|---|---|
| 2006/0230339 A1* | 10/2006 | Achanta et al. | 715/513 |
| 2007/0033209 A1* | 2/2007 | Magee et al. | 707/102 |
| 2007/0113171 A1 | 5/2007 | Behrens et al. | |
| 2007/0113222 A1* | 5/2007 | Dignum et al. | 717/143 |
| 2008/0028376 A1* | 1/2008 | Kostoulas et al. | 717/143 |
| 2008/0098019 A1 | 4/2008 | Sthanikam et al. | |
| 2008/0301634 A1* | 12/2008 | Kuznetsov et al. | 717/115 |
| 2008/0320382 A1* | 12/2008 | Kuznetsov et al. | 715/234 |
| 2009/0006944 A1* | 1/2009 | Dang et al. | 715/234 |
| 2009/0070459 A1* | 3/2009 | Cho et al. | 709/224 |
| 2009/0171651 A1* | 7/2009 | Lunteren et al. | 703/26 |
| 2009/0249186 A1* | 10/2009 | Fetzer | 715/234 |
| 2010/0162102 A1* | 6/2010 | Lemoine | 715/239 |
| 2011/0119440 A1* | 5/2011 | Pandya | 711/105 |

OTHER PUBLICATIONS

Nicola et al., "XML Parsing: A Threat to Database Performance", pp. 175-178, Nov. 3, 2003.

Jan Van Lunteren et al., "XML Accelerator Engine", pp. 1-6, 2004.

Tarari, The Acceleration Company, RAX, Random Access XML, "Fundamentally Changing How XML is Used and Processed", pp. 1-28, 2004.

Intel, "Accelerating XML Processing with Intel SSE4.2 to Improve Business Solutions", pp. 1-12, 2008.

Cisco, "Cisco ACE XML Gateway", pp. 1-6, 2008.

* cited by examiner

| OK3 | OK2 | OK1 | OK0 | SEL3 | SEL2 | SEL1 | SEL0 | SELBASE Inc |
|---|---|---|---|---|---|---|---|---|
| 0 | 0 | 0 | 0 | 0 | 0 | 0 | 0 | 0 |
| 0 | 0 | 0 | 1 | X | X | X | 0 | 3 |
| 0 | 0 | 1 | 0 | X | X | X | 1 | 3 |
| 0 | 1 | 0 | 0 | X | X | X | 2 | 3 |
| 1 | 0 | 0 | 0 | X | X | X | 3 | 3 |
| 0 | 0 | 1 | 1 | X | X | 0 | 0 | 2 |
| 0 | 1 | 1 | 0 | X | X | 1 | 1 | 2 |
| 1 | 1 | 0 | 0 | X | X | 2 | 2 | 2 |
| 0 | 1 | 0 | 1 | X | X | 1 | 0 | 2 |
| 1 | 0 | 0 | 1 | X | X | 2 | 0 | 2 |
| 1 | 0 | 1 | 0 | X | X | 2 | 1 | 2 |
| 0 | 1 | 1 | 1 | X | 0 | 0 | 0 | 1 |
| 1 | 1 | 1 | 0 | X | 1 | 1 | 1 | 1 |
| 1 | 1 | 0 | 1 | X | 1 | 1 | 0 | 1 |
| 1 | 0 | 1 | 1 | X | 1 | 0 | 0 | 1 |
| 1 | 1 | 1 | 1 | 0 | 0 | 0 | 0 | 0 |

FIG. 7

XML POST-PROCESSING HARDWARE ACCELERATION

TECHNICAL FIELD

The disclosure relates generally to XML (extensible markup language) post-processing, and more particularly, to XML post-processing hardware acceleration for high-speed string and format checking and whitespace collapsing.

BACKGROUND

XML post processing such as schema validation is typically done by software running on general purpose CPUs. Hardware acceleration techniques have been applied to allow the performance of some aspects of schema validation to be increased significantly. However, one of the essential parts of schema validation in accordance with the W3C XML Schema standard, namely simple type checking (e.g., string and format checking), is difficult to accelerate. This is mainly due to the requirements of the standard related to the handling of whitespace characters, which include, for example, spaces, tabs, line feeds, and carriage returns.

The W3C XML Schema standard specifies three ways of handling whitespace: "preserve"; "replace"; and "collapse". "Preserve" keeps the whitespace as is, "replace" normalizes the whitespace to 0x20 characters (spaces), and "collapse" removes all leading and trailing whitespace and collapses any contiguous whitespace to a single 0x20 character (space). The handling of whitespace is performed before any string checking. While "preserve" and "replace" are relatively simple, "collapse" requires keeping state, which can slow processing down significantly (depending on how much whitespace is part of the string).

SUMMARY

Aspects of the invention are directed to XML post-processing hardware acceleration for high-speed string and format checking (e.g., simple type checking) and whitespace collapsing.

A first aspect of the invention provides an apparatus for processing text data, comprising: a post processing engine (PPE); a set of post processing state machines coupled to the PPE; and a memory for storing text data to be processed by the set of post processing state machines; wherein the set of post processing state machines includes a whitespace handler state machine for reading text data from the memory and for applying a whitespace facet to at least 4 bytes of the text data during a clock cycle.

A second aspect of the invention provides an integrated circuit, comprising: a post processing engine (PPE); a set of post processing state machines coupled to the PPE; and a memory for storing text data to be processed by the set of post processing state machines; wherein the set of post processing state machines includes a whitespace handler state machine for reading text data from the memory and for applying a whitespace facet to at least 4 bytes of the text data during a clock cycle.

A third aspect of the invention provides a method for processing text data, comprising: applying a whitespace facet to at least 4 bytes of text data during a clock cycle to provide processed text data; and applying string and format checking to at least 4 bytes of the processed text data during a subsequent clock cycle.

A fourth aspect of the invention provides a method, comprising: deploying an integrated circuit to a computer system, wherein the integrated circuit comprises: a post processing engine (PPE); a set of post processing state machines coupled to the PPE; and a memory for storing text data to be processed by the set of post processing state machines; wherein the set of post processing state machines includes a whitespace handler state machine for reading text data from the memory and for applying a whitespace facet to at least 4 bytes of the text data during a clock cycle.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

The drawings are intended to depict only typical aspects of the invention, and therefore should not be considered as limiting the scope of the invention. In the drawings, like numbering represents like elements between the drawings.

DETAILED DESCRIPTION

As indicated above, aspects of the invention are directed to XML post-processing hardware acceleration for high-speed string and format checking and whitespace collapsing. As used herein, unless otherwise noted, the term "set" means one or more (i.e., at least one) and the phrase "any solution" means any now known or later developed solution. Although described below for use in schema validation, the string and format checking (e.g., simple type checking) of the invention can also be used for type and string checking in xPath (XML Path Language) evaluation, XSLT (XSL Transformations), and the like.

In accordance with an embodiment, a set of post processing engine (PPE) state machines are added to a PPE of an XML hardware accelerator. Examples of XML hardware accelerators that include a PPE are described, for example, in U.S. Pat. Nos. 7,287,217, 7,318,194, and 7,454,696, assigned to International Business Machines Corporation, the contents of which are incorporated herein by reference.

A PPE is a special purpose processor which includes sets of instruction words optimized for performing functions common in XML post processing. The PPE state machines enhance the functionality of a PPE. The PPE and the PPE state machines can be implemented using, for example, one or more integrated circuits such as hardware FPGAs (field-programmable gate arrays), ASICs (application-specific integrated circuits), and/or the like.

When used in conjunction with a PPE, the PPE state machines allow multiple bytes of text data (e.g., characters) to be processed each clock cycle while performing string and format checking, including whitespace handling. The processing of multiple characters each clock cycle provides a significant performance improvement over XML post processing performed using software running on general purpose CPUs.

Figure 1:
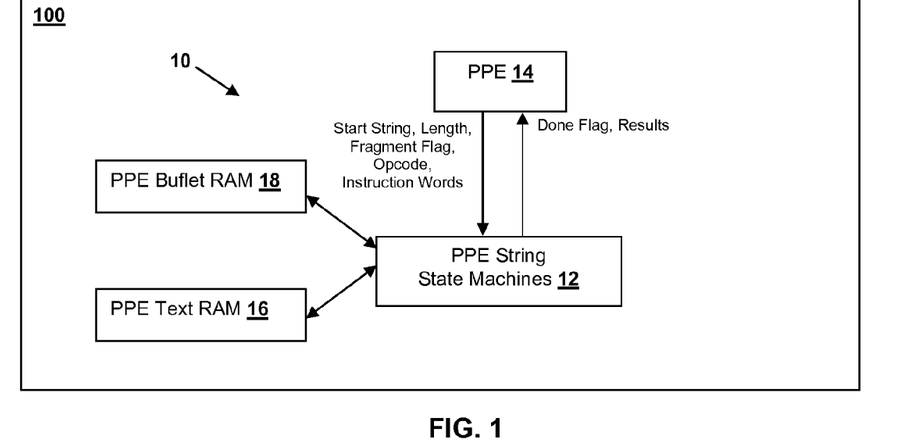
FIG. 1 depicts an illustrative PPE string hardware architecture according to an embodiment.

Turning to the drawings, FIG. 1 shows an illustrative PPE string hardware architecture 10 according to an embodiment. The PPE string hardware architecture 10 can be implemented separately from, or as part of, a computer system 100, which generally includes at least one processor, memory, and a communications interface. Text data to be processed by the PPE string hardware architecture 10 can be stored, for example, in the memory of the computer system 100 and supplied to the PPE string hardware architecture 10 via the communications interface. Instruction words for controlling the operation/functionality of the PPE string hardware architecture 10 can be stored, for example, in the memory of the computer system 100 and/or on a computer-readable storage medium.

The PPE string hardware architecture 10 can be implemented on an integrated circuit. The integrated circuit can be deployed to a computer system (e.g., computer system 100) using any solution (e.g., on an add-on card or board). Such an add-on card or board generally includes an I/O interface that allows the computer system to provide and/or update the instruction words used by the PPE string hardware architecture 10 to provide string and format checking and whitespace collapsing.

A set of PPE string state machines 12 for implementing string and format checking, including whitespace handling ("preserve", "replace", and "collapse") are initiated and controlled by a PPE 14 in response to the execution of a "string" instruction by the PPE 14. Text data to be processed by the PPE string state machines 12 is supplied to the PPE string state machines 12 via a PPE text RAM 16 and a PPE buflet RAM 18, which will be described in greater detail below.

The PPE 14 initiates processing by sending a "start" string to the PPE string state machines 12. The PPE 14 also sends to the PPE string state machines 12 information needed to process the text data. This may include, for example, the length of the text data to be processed, a fragment flag indicating whether all or a part of the text data has been sent, opcode for the string function to be performed by the PPE string state machines 12, and instruction words required by the PPE string state machines 12 to process and check the text data. In response to the "start" string, the PPE string state machines 12 read the information provided by the PPE 14 and begin checking the text data. The PPE string state machines 12 return a done flag and results to the PPE 14.

Figure 2:
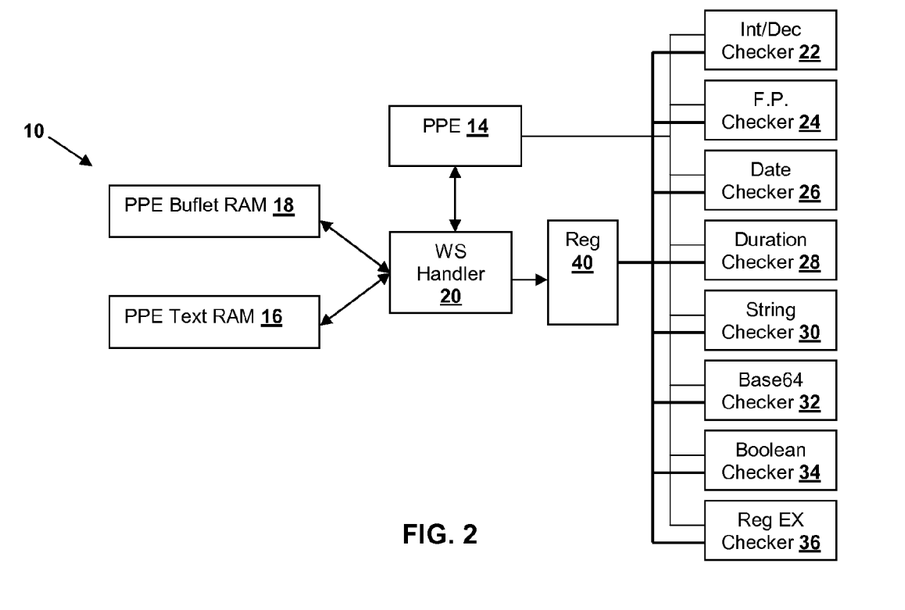
FIG. 2 depicts the PPE string hardware architecture of FIG. 1 according to an embodiment.

A more detailed diagram of the PPE string hardware architecture 10 in accordance with an embodiment is shown in FIG. 2. The PPE string state machines 12 comprise several smaller state machines, each of which specializes in a particular function:

whitespace (WS) handler state machine 20: preprocesses the text data out of the PPE text RAM 16 and PPE buflet RAM 18 and applies the appropriate whitespace facet ("preserve", "replace", and "collapse") to the text data;

integer/decimal checker state machine 22: checks integer and decimal number format including length and range checking as required;

floating point checker state machine 24: checks floating point number format;

date checker state machine 26: checks date and time format including range checking as required;

duration checker state machine 28: checks duration format (e.g., a valid ISO (International Organization for Standardization) 8601 duration);

string checker state machine 30: string format checking, length checking and string compare.

base64 checker state machine 32: checks base64 format;

Boolean checker state machine 34: checks Boolean format (e.g., "0", "1", "true", "false"); and reg EX checker state machine 36: checks string against a regular expression.

The text data processed by the WS handler state machine 20 is loaded into a register (reg) 40 (e.g., an 8 byte register) for subsequent processing by one or more of the "checker" state machines 22-36.

Three different whitespace facets that can be applied via the WS handler state machine 20 include:

preserve: leave whitespace as is;

replace: replace tabs, carriage returns, and line feeds with 0x20 characters (spaces), but do not delete any whitespace; and collapse: delete leading and trailing whitespace and collapse other "runs" of whitespace to a single 0x20 character (space).

Figure 3:
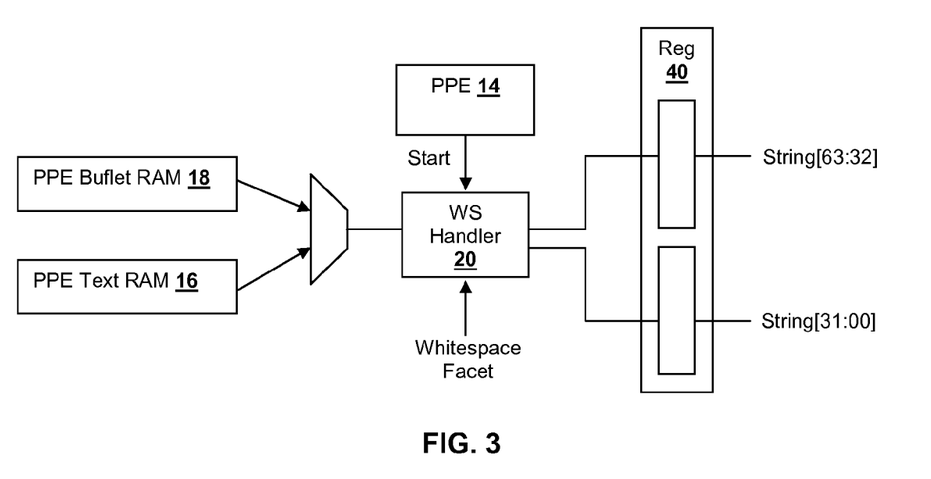
FIG. 3 depicts a whitespace (WS) handler state machine according to an embodiment.

As depicted in FIG. 3, the WS handler state machine 20 is responsible for reading text data out of the PPE text RAM 16 and PPE Buflet RAM 18, applying the required whitespace facet, and loading the processed text data into the register 40 for processing by the "checker" state machines 22-36 (FIG. 2). The WS handler state machine 20 communicates with the PPE text RAM 16 and PPE Buflet RAM 18 in order to instruct the PPE text RAM 16 and PPE Buflet RAM 18 when to advance read pointers to unload data.

The WS handler state machine 20 receives a "start" signal from the PPE 14 along with a length value indicating the length of the text data to be processed, two whitespace flags (replace WS, collapse WS), and a flag indicating whether all or only part of the text data has been sent to the PPE 14. The WS handler state machine 20 is also responsible for managing and maintaining state regarding whether some of the text data to be processed is in the PPE buflet RAM 18 (e.g., the PPE buflet RAM 18 holds text data that was previously received in an early chunk of a document), or if all text data is in the PPE text RAM 16. Once the "start" signal is received from the PPE 14, the WS handler state machine 20 fetches data from the appropriate RAM (i.e., PPE text RAM 16 or PPE text RAM 18) and applies the required whitespace facet.

Figure 4:
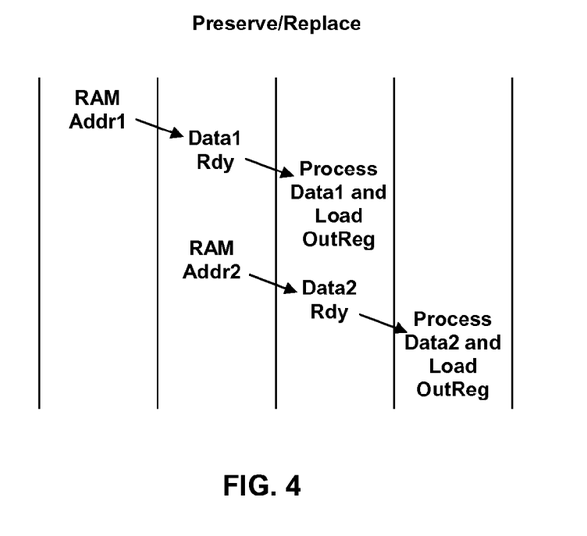
FIG. 4 depicts an illustrative functional timing diagram for the replace/preserve whitespace operation of a WS handler state machine according to an embodiment.

In operation, the preserve and replace whitespace facets are relatively simple to implement, since the input byte information of the text data is preserved in the output, with the option that some characters (e.g., a 0xA (line feed), 0xD (carriage return) or 0x09 (tab)) may be replaced by a 0x20 character (space). For these options, the WS handler state machine 20 processes a plurality of bytes (e.g., 8 bytes) at a time, reading text data from the PPE text RAM 16 or PPE text RAM 18, and loads the processed text data into the register 40. An illustrative functional timing diagram for the preserve/replace whitespace operation of the WS handler state machine 20 is depicted in FIG. 4.

The collapse function performed by the WS handler state machine 20 is much more complex because it potentially requires shifting bytes of text data into other byte lanes. Collapse removes leading and trailing whitespace, and changes any contiguous whitespace characters to one 0x20 character (space). For example, if the input text data is "howdy\t\t\t\tworld," the WS handler state machine 20 produces the following:

Input:
1: "howdy\t\t\t"
2: "world"

Output:
1: "howdy wo"
2: "rld"

In this example, the bytes of text data associated with the string "world" have been shifted "backward" into other byte lanes that previously included whitespace characters (e.g., "\t").

Figure 5:
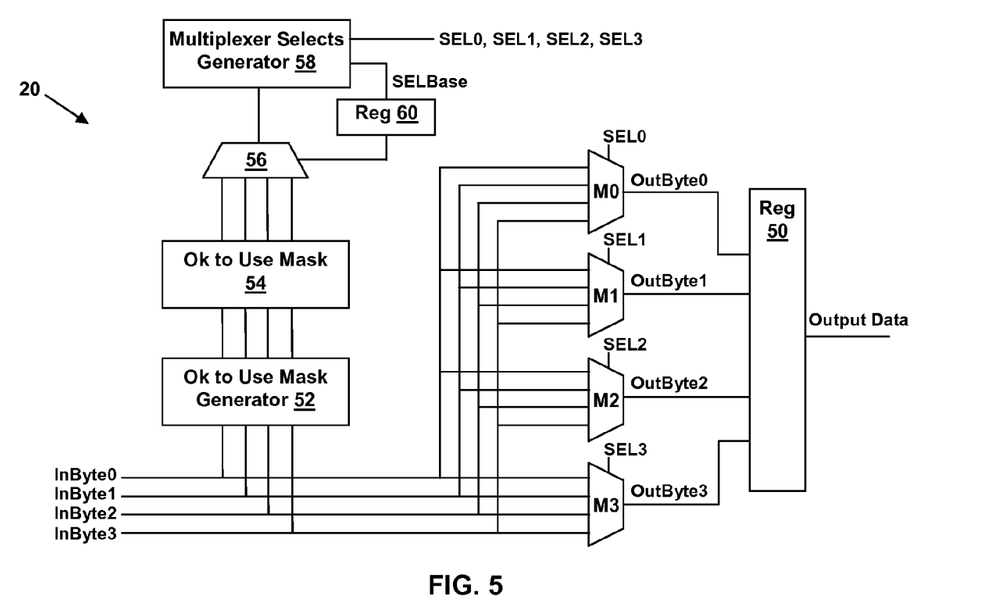
FIG. 5 depicts a WS handler state machine for processing 4 bytes of text data each clock cycle according to an embodiment.
Figure 8:
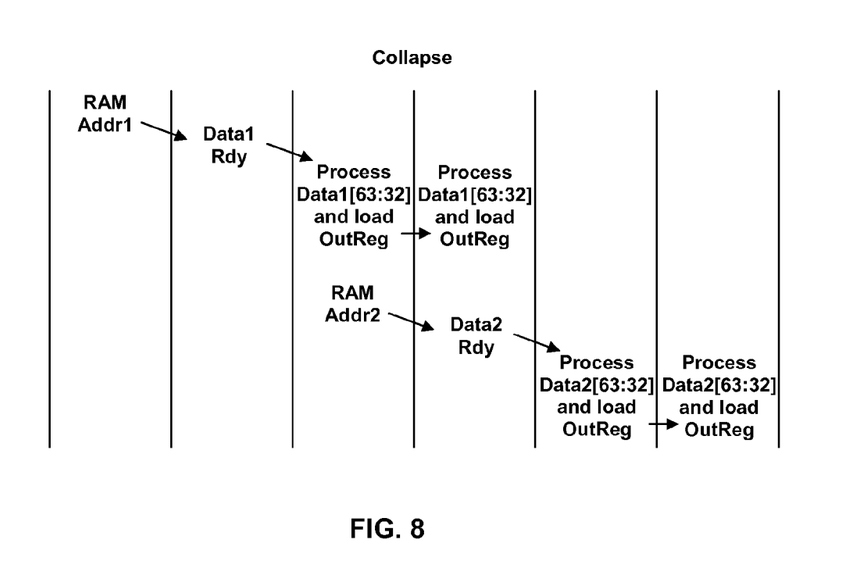
FIG. 8 depicts an illustrative functional timing diagram for the collapse whitespace operation of the WS handler state machine of FIG. 5 according to an embodiment.

The WS handler state machine 20 is configured to implement a whitespace collapse algorithm that is capable of processing multiple bytes (e.g., 4, 8, 16, etc.) of characters each clock cycle. FIG. 5 illustrates an embodiment of the WS handler state machine 20 that is capable of processing 4 bytes of characters each clock cycle. A functional timing diagram for the collapse whitespace operation of the WS handler state machine of FIG. 5 according to an embodiment is depicted in FIG. 8.

The WS handler state machine 20 depicted in FIG. 5 reads in 4 bytes of input text data, InByte0, InByte1, InByte2, and InByte3, from the PPE text RAM 16 or PPE text RAM 18 (FIG. 2). The 4 bytes of input text data, InByte0, InByte1, InByte2, and InByte3, are supplied to 4 multiplexers M0, M1, M2, and M3, respectively. The multiplexer M0 outputs a single byte of text data OutByte0, while the multiplexers M1, M2, and M3 output a single byte of text data OutByte1, OutByte2, and OutByte3, respectively. The outputs Outbyte0, OutByte1, OutByte2, and OutByte3, of the multiplexers M0, M1, M2, and M3, respectively, are input into a 4 byte output register 50.

An "OK to use mask" generator 52 is also provided with the input text data InByte0, InByte1, InByte2, and InByte 3. The "OK to use mask" generator 52 generates an "OK to use mask" 54 comprising one bit per byte. Each bit of the "OK to use mask" 54 indicates if a corresponding byte of input text data should be passed to the output. If a byte of input text data is a whitespace character, the corresponding bit in the "OK to use mask" 54 is set to 0 (0=skip). If a byte of input text data is not a whitespace character, the corresponding bit in the "OK to use mask" 54 is set to 1 (1=ok to use).

The "OK to use mask" 54 is input into a multiplexer 56. The output of the multiplexer 56 is used by a multiplexer selects generator 58 to determine the multiplexer selects SEL0, SEL1, SEL2, and SEL3 of the multiplexers M0, M1, M2, and M3, respectively. The multiplexer selects generator 58 also determines a base multiplexer select SELBase, which is used to control the multiplexer 56. A current value of the base multiplexer select SELBase is stored in a register 60.

Figure 6:
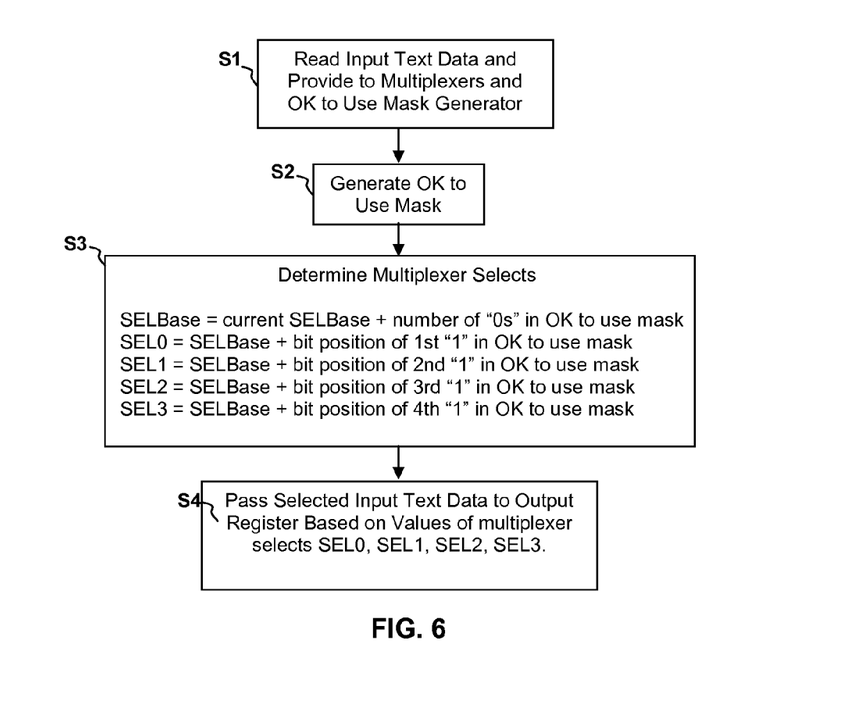
FIG. 6 depicts a flow diagram of a whitespace collapse algorithm implemented by the WS handler state machine of FIG. 5 according to an embodiment.

A flow diagram of an embodiment of a whitespace collapse algorithm implemented by the WS handler state machine 20 in FIG. 5 for processing 4 bytes of input text data each clock cycle is depicted in FIG. 6. The whitespace collapse algorithm can be extended, for example, to 8 multiplexers and multiplexer selects such that 8 bytes of input text data can be processed each clock cycle.

At S1, input text data (InByte0, InByte1, InByte2, InByte3) is read from the PPE text RAM 16 or PPE buflet RAM 18 (FIG. 2). The input text data (InByte0, InByte1, InByte2, InByte3) is provided to the multiplexers (M0, M1, M2, M3) and the "OK to use mask" generator 52. At S2, the "OK to use mask" generator 52 generates an "OK to use mask" 54 comprising one bit per byte. If a byte of input text data is not a whitespace character and should be passed to the output, the corresponding bit in the "OK to use mask" 54 is set to 1 (1=ok to use). If a byte of input text data is a whitespace character, the corresponding bit in the "OK to use mask" 54 is set to 0 (0=skip).

At S3, the "OK to use mask" 54 is used to determine the multiplexer selects (SEL0, SEL1, SEL2, SEL3) of the multiplexers (M0, M1, M2, M3), respectively, and the multiplexer select SELBase of the multiplexer 56 as follows:

SELBase=current SELBase+number of "0s" in "OK to use mask" 54;

SEL0=SELBase+bit position of 1st "1" in "OK to use mask" 54;

SEL1=SELBase+bit position of 2nd "1" in "OK to use mask" 54;

SEL2=SELBase+bit position of 3rd "1" in "OK to use mask" 54; and

SEL3=SELBase+bit position of 4th "1" in "OK to use mask" 54.

Figure 7:
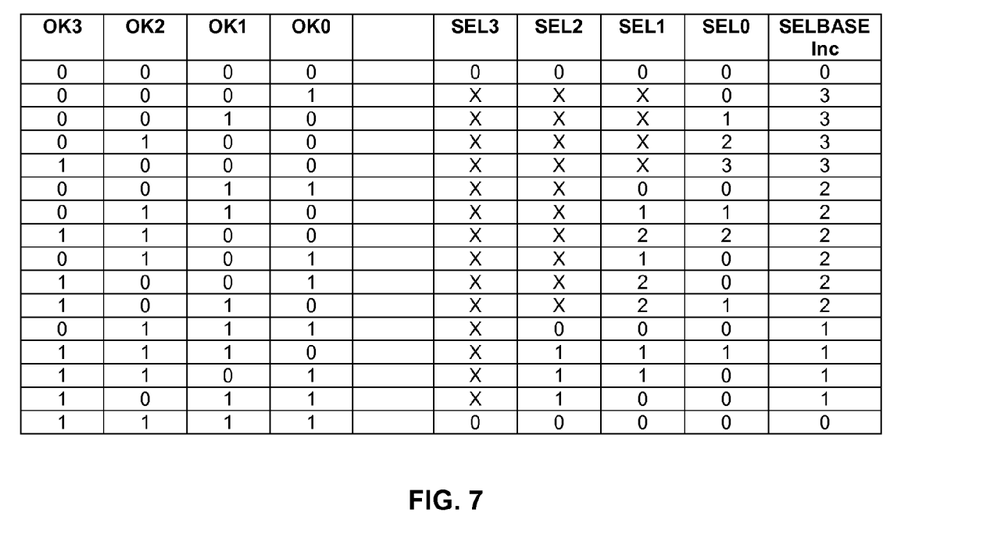
FIG. 7 depicts data associated with the whitespace collapse algorithm of FIG. 6 according to an embodiment.

The same information is presented in table form in FIG. 7. The first 4 columns in FIG. 7 list the values of the "OK to use mask" 54 (OK0, OK1, OK2, OK3), while the second 4 columns list the corresponding values of the multiplexer selects (SEL0, SEL1, SEL2, SEL3). The last column in FIG. 7 details the amount that SELBase is incremented based on the number of "0s" in the "OK to use mask" 54.

At S4, the multiplexers (M0, M1, M2, M3) pass selected input text data (if any) to the output register 50 based on the values of the multiplexer selects (SEL0, SEL1, SEL2, SEL3).

Examples of the operation of the WS handler state machine 20 and whitespace collapse algorithm are presented below.

Example 1

The first example includes the input text data "howdy world". This example does not include any whitespace characters. To this extent, the input text data is passed through to the output. The input text data "howdy world" comprises two 8-byte chunks: "howdy wo"; and "rld". As detailed below, it takes 3 clock cycles to process the input text data.

Cycle 1:
   Input bytes: "howd"
   OK to use mask: 'b1111 (i.e., no whitespace characters)
   SELbase: 0
   SEL0: 0
   SEL1: 1
   SEL2: 2
   SEL3: 3
   Output bytes: "howd"

Cycle 2:
   Input bytes: "y wo"
   OK to use mask: 'b1111
   SELbase: 0
   SEL0: 0
   SEL1: 1
   SEL2: 2
   SEL3: 3
   Output bytes: "y wo"

Cycle 3:
   Input bytes "rld"
   OK to use mask: '1111
   SELbase: 0
   SEL0: 0

SEL1: 1
SEL2: 2
SEL3: 3
Output bytes: "rld"

Example 2

The second example includes the input text data "\t\t\thowdy \tworld\t".
This example includes several instances of the whitespace character "\t". The input text data "\t\t\thowdy \tworld\t" is input using two 8-byte chunks:
"\t\t\thowdy"; and "\tworld\t".
As detailed below, it takes 5 clock cycles to collapse the whitespace and send the data forward in 4-byte chunks.
Cycle 1:
   Input bytes: "\t\t\th"
   OK to use mask: 'b0001
   SELBase: 0
   SEL0: 3
   SEL1: 0
   SEL2: 1
   SEL3: 2
   Output Bytes: "h"
   Input carried to next cycle: none
   Number of output bytes to still fill: 3
Cycle 2:
   Input Bytes: "owdy"
   Ok to use mask: 'b1111
   SELBase: 3
   SEL0: 3
   SEL1: 0
   SEL2: 1
   SEL3: 2
   Output bytes="howd"
   Input carried to next cycle: "y"
   Number of output bytes to still fill: 0
Cycle 3:
   Input Bytes: "y"
   Ok to use mask: 'b1111
   SELBase: 3
   SEL0: 3
   SEL1: 0
   SEL2: 1
   SEL3: 2
   Output bytes="y"
   Input carried to next cycle: none
   Number of output bytes to still fill: 3
Cycle 4:
   Input Bytes: "\two"
   Ok to use mask: 'b011
   SELBase: 3
   SEL0: n/a
   SEL1: 0
   SEL2: 2
   SEL3: 3
   Output bytes="y wo"
   Input carried to next cycle: none
   Number of output bytes to still fill: 0
Cycle 5:
   Input Bytes: "rld\t"
   Ok to use mask: 'b1110
   SELBase: 3
   SEL0: 0
   SEL1: 1
   SEL2: 2
   SEL3: 3
   Output bytes="rld"
   Input carried to next cycle: none
   Number of output bytes to still fill: 0

Referring again to FIG. 2, the text data processed by the WS handler state machine 20 is loaded into the register 40 for subsequent processing by one or more of the "checker" state machines 22-36. The processing performed by the "checker" state machines 22-36 is controlled by instruction words provided by the PPE 14. In an embodiment, the "checker" state machines 22-36 are configured to wait until 4-byte chunks are available in the register 40 for processing (as long as there are 4 bytes of data left to process). The "checker" state machines 22-36 are capable of processing at least 4 bytes per clock cycle. In another embodiment, the "checker" state machines 22-36 are configured to wait until 8-byte chunks are available in the register 40 for processing.

The "checker" state machines 22-36 have the ability to stall the WS handler state machine 20. For example, the string checker state machine 30 may need to stall the WS handler state machine 20 in order to fetch comparison data from an instruction cache or system memory. The "checker" state machines 22-36 also have the ability to feed the WS handler state machine 20 "start offset" instructions in order to start checking later in a string. This may be desired if a string has already been partially processed, to avoid having to redo processing that has already been completed.

The string checker state machine 30 performs string format checking/string compare in accordance with instruction word(s) provided by the PPE 14. For instance, the string checker state machine 30 can be used to check a string of data against a minimum and/or maximum allowed number of UTF-8 characters in the string. As another example, the string checker state machine 30 can be used to compare a string of data against another string of data.

In an embodiment, the string checker state machine 30 wakes up when it receives a "start" signal and instruction word(s) from the PPE 14. In response, the string checker state machine 30 performs the requested format check/string compare against an input string of data that has been processed by the WS handler state machine 20. This may involve, for example, the use of comparison data provided with the instruction word(s) and/or fetched from memory. In an embodiment, the string checker state machine 30 returns a "pass"/"fail" result of the requested format check/string compare, an error code, and a byte counter. The error code provides an indication of which test has failed (e.g., min length, max length, etc.). The byte counter indicates which byte in the input string of data caused a problem (e.g., during a string compare).

The integer/decimal checker state machine 22 and the floating point checker state machine 24 read the data processed by the WS handler state machine 20 and stored in the register 40. The integer/decimal checker state machine 22 checks integer and decimal number format, length, and range as specified in the instruction word(s) received from the PPE 14. Similarly, the floating point checker state machine 24 checks floating point number format as specified in received instruction word(s). In general, all of the "check number" instruction words only allow trailing and leading whitespace characters and only allow the "collapse" whitespace facet.

The remaining "checker" state machines, namely the date checker state machine 26 (checks date and time format), duration checker state machine 28 (checks duration format), base64 checker state machine 32 (checks base64 format), Boolean checker state machine 34 (checks Boolean format), and reg EX checker state machine 36 (checks string against a regular expression), read the data processed by the WS handler state machine 20 and stored in the register 40. These "checker" state machines operate as specified in the instruction word(s) received from the PPE 14.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for processing text data, comprising:
applying, via a whitespace handler state machine, a whitespace facet to at least 4 bytes of text data during a clock cycle to provide further processed text data; and
applying string and format checking to the at least 4 bytes of the further processed text data during a subsequent clock cycle;
wherein applying the whitespace facet further comprises:
performing one of a plurality of checking functions on the further processed text data in response to instructions from a post processing engine (PPE) and in response to receiving a 4 byte chunk of the further processed text data from the whitespace handler state machine;
generating a mask, the mask including a set of bits, each bit in the set of bits in the mask indicating if a corresponding byte of the text data should be passed as output data; and
generating multiplexer selects of a set of output multiplexers based on bit values in the mask; and
wherein generating a mask further comprises, for each bit in the set of bits in the mask: assigning a first value to the bit in response to detecting the corresponding byte of the text data comprises a whitespace character; and assigning a second value to the bit in response to detecting the corresponding byte of the text data does not comprise the whitespace character.

2. The method of claim 1, wherein the whitespace facet comprises a preserve whitespace facet.

3. The method of claim 1, wherein the whitespace facet comprises a replace whitespace facet.

4. The method of claim 1, wherein the whitespace facet comprises a collapse whitespace facet.

5. The method of claim 1, further comprising:
inputting the mask into a mask multiplexer; and
determining the multiplexer selects of the output multiplexers using an output of the mask multiplexer.

6. The method of claim 5, wherein determining the multiplexer selects of the output multiplexers using the output of the mask multiplexer further comprises:
generating a new value of a multiplexer select of the mask multiplexer based on a current value of the multiplexer select of the mask multiplexer and the number of bits in the mask having the first value; and
generating the multiplexer selects of the output multiplexers based on the new value of the multiplexer select of the mask multiplexer and bit positions of the bits in the mask having the second value.

7. The method of claim 1, wherein the plurality of checking functions include integer/decimal checking, floating point checking, date checking, duration checking, string checking, base64 checking, Boolean checking, and reg EX checking.

8. A method, comprising:
deploying an integrated circuit to a computer system, wherein the integrated circuit comprises:
a post processing engine (PPE);
a set of post processing state machines coupled to the PPE; and
a memory for storing text data to be processed by the set of post processing state machines;
wherein the set of post processing state machines includes a whitespace handler state machine for reading the text data from the memory and for applying a whitespace facet to at least 4 bytes of the text data during a clock cycle;
wherein applying the whitespace facet further comprises:
performing one of a plurality of checking functions on the text data in response to instructions from the PPE and in response to receiving a 4 byte chunk of the text data from the whitespace handler state machine;
generating a mask, the mask including a set of bits, each bit in the set of bits in the mask indicating if a corresponding byte of the text data should be passed as output data; and
generating multiplexer selects of a set of output multiplexers based on bit values in the mask; and
wherein generating the mask further comprises, for each bit in the set of bits in the mask: assigning a first value to the bit in response to detecting the corresponding byte of the text data comprises a whitespace character; and assigning a second value to the bit in response to detecting the corresponding byte of the text data does not comprise the whitespace character.

9. The method of claim 8, wherein the whitespace facet comprises a preserve whitespace facet.

10. The method of claim 8, wherein the whitespace facet comprises a replace whitespace facet.

11. The method of claim 8, wherein the whitespace facet comprises a collapse whitespace facet.

12. The method of claim 8, wherein the plurality of checking functions include integer/decimal checking, floating point checking, date checking, duration checking, string checking, base64 checking, Boolean checking, and reg EX checking.

13. An apparatus for processing text data, comprising:
a post processing engine (PPE);
a set of post processing state machines coupled to the PPE; and
a memory for storing text data to be processed by the set of post processing state machines;
wherein the set of post processing state machines includes a whitespace handler state machine for reading the text data from the memory and for applying a whitespace facet to at least 4 bytes of the text data during a clock cycle;
wherein the whitespace handler state machine further comprises:
at least one checker state machine for performing one of a plurality of checking functions on the text data in response to instructions from the PPE and in response to receiving a 4 byte chunk of the text data from the whitespace handler state machine;
a mask generator for generating a mask, the mask including a set of bits, each bit in the set of bits in the mask indicating if a corresponding byte of the text data read by the whitespace handler state machine should be passed as output data;
a set of output multiplexers; and
a multiplexer select generator for generating multiplexer selects of the output multiplexers based on bit values in the mask;
wherein, for each bit in the set of bits in the mask, the mask generator assigns a first value to the bit in response to detecting the corresponding byte of text data comprises a whitespace character, and wherein the mask generator assigns a second value to the bit in response to detecting the corresponding byte of text data does not comprise the whitespace character.

14. The apparatus of claim 13, wherein the whitespace facet comprises a preserve whitespace facet.

15. The apparatus of claim 13, wherein the whitespace facet comprises a replace whitespace facet.

16. The apparatus of claim 13, wherein the whitespace facet comprises a collapse whitespace facet.

17. The apparatus of claim 14, wherein the whitespace handler state machine is configured to apply the preserve whitespace facet to at least 8 bytes of the text data during the clock cycle.

18. The apparatus of claim 15, wherein the whitespace handler state machine is configured to apply the replace whitespace facet to at least 8 bytes of the text data during the clock cycle.

19. The apparatus of claim 13, further comprising a mask multiplexer for receiving the mask as an input, wherein the multiplexer select generator determines the multiplexer selects of the output multiplexers using an output of the mask multiplexer.

20. The apparatus of claim 19, wherein the multiplexer selects generator further generates a multiplexer select of the mask multiplexer.

21. The apparatus of claim 20, further comprising a register, coupled between the multiplexer selects generator and the mask multiplexer, for storing a current value of the multiplexer select of the mask multiplexer.

22. The apparatus of claim 21, wherein the multiplexer selects generator generates a new value of the multiplexer select of the mask multiplexer based on the current value of the multiplexer select of the mask multiplexer stored in the register and the number of bits in the mask having the first value, and wherein the multiplexer selects generator generates the multiplexer selects of the output multiplexers based on the new value of the multiplexer select of the mask multiplexer and bit positions of the bits in the mask having the second value.

23. The apparatus of claim 13, wherein the set of post processing state machines further comprises:
a set of checker state machines for checking the text data processed by the whitespace handler state machine.

24. The apparatus of claim 13, wherein the plurality of checking functions include integer/decimal checking, floating point checking, date checking, duration checking, string checking, base64 checking, Boolean checking, and reg EX checking.

* * * * *